United States Patent
Okawa et al.

(10) Patent No.: US 7,428,617 B2
(45) Date of Patent: Sep. 23, 2008

(54) CACHE MEMORY AND METHOD TO MAINTAIN CACHE-COHERENCE BETWEEN CACHE MEMORY UNITS

(75) Inventors: Tomoyuki Okawa, Kawasaki (JP); Kumiko Endo, Kawasaki (JP); Hiroyuki Kojima, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 682 days.

(21) Appl. No.: 10/998,561

(22) Filed: Nov. 30, 2004

(65) Prior Publication Data

US 2006/0026355 A1    Feb. 2, 2006

(30) Foreign Application Priority Data

Jul. 29, 2004    (JP) .............................. 2004-222401

(51) Int. Cl.
    *G06F 12/00*    (2006.01)
(52) U.S. Cl. .................. 711/144; 711/122; 711/141
(58) Field of Classification Search .................. 711/122, 711/141, 142, 143, 144, 145
    See application file for complete search history.

(56) References Cited

U.S. PATENT DOCUMENTS

| 5,003,459 | A | 3/1991 | Ramanujan et al. |
|---|---|---|---|
| 5,668,968 | A | 9/1997 | Wu |
| 5,694,573 | A | 12/1997 | Cheong et al. .............. 395/449 |
| 6,115,794 | A | 9/2000 | Arimilli et al. .............. 711/141 |
| 6,804,799 | B2 * | 10/2004 | Zuraski, Jr. .................. 714/54 |
| 2002/0199151 | A1 | 12/2002 | Zuraski, Jr. |

FOREIGN PATENT DOCUMENTS

| JP | 8-235061 | 9/1996 |
|---|---|---|
| JP | 10-301850 | 11/1998 |
| JP | 2002-055881 | 2/2002 |

OTHER PUBLICATIONS

European Search Report, mailed Apr. 17, 2008 and issued in corresponding European Patent Application No. 04257443.4-1229.

* cited by examiner

*Primary Examiner*—Jack A Lane
(74) *Attorney, Agent, or Firm*—Staas & Halsey LLP

(57) ABSTRACT

A cache memory includes a first-level cache-memory unit that stores data; a second-level cache-memory unit that stores data that is same as the data stored in the first-level cache-memory unit; a storage unit that stores a part of information relating to the first-level cache-memory unit; and a coherence maintaining unit that maintains cache-coherence between the first-level cache-memory unit and the second-level cache-memory unit based on information stored in the storage unit.

11 Claims, 9 Drawing Sheets

FIG. 8

| | |
|---|---|
| 0000 | COMMAND AND OPERAND ARE BOTH INVALID |
| 0110 | ONLY WAY 0 OF OPERAND IS UPDATED |
| 0111 | ONLY WAY 1 OF OPERAND IS UPDATED |
| 1000 | WAY 0 OF COMMAND IS VALID, AND OPERAND IS INVALID |
| 1001 | WAY 1 OF COMMAND IS VALID, AND OPERAND IS INVALID |
| 1010 | COMMAND IS INVALID, AND WAY 0 OF OPERAND IS COMMUNAL |
| 1011 | COMMAND IS INVALID, AND WAY 1 OF OPERAND IS COMMUNAL |
| 1100 | WAY 0 OF COMMAND IS VALID, AND WAY 0 OF OPERAND IS COMMUNAL |
| 1101 | WAY 0 OF COMMAND IS VALID, AND WAY 1 OF OPERAND IS COMMUNAL |
| 1110 | WAY 1 OF COMMUNAL IS VALID, AND WAY 0 OF OPERAND IS COMMUNAL |
| 1111 | WAY 1 OF COMMAND IS VALID, AND WAY 1 OF OPERAND IS COMMUNAL |

CACHE MEMORY AND METHOD TO MAINTAIN CACHE-COHERENCE BETWEEN CACHE MEMORY UNITS

BACKGROUND OF THE INVENTION

1.) Field of the Invention

The present invention relates to a cache memory and a method for controlling a cache memory.

2.) Description of the Related Art

In recent years, a cache memory is used in solving the problem of data delay between a central processing unit (CPU) and a main memory. The cache memory itself has a layered structure, and presently a plurality of cache memories is used. A first level cache and a second level cache are classified sequentially from the cache memory, which functions nearly as speedily as the CPU.

The conventional cache memory holds a copy of a tag relating to the first level cache in the second level cache, and the second level cache uses the copy of the tag to obtain information from the first level cache, thereby eliminating relating contradictions between the first level cache and the second level cache.

For example, as shown in FIG. 11, when a tag of the second level cache is accessed by a physical index, a copy of the tag of the first level cache is accessed by using a virtual index included in the second level cache, and coherence is maintained between the two by obtaining the registration status of the first level cache.

A technique for increasing the decoding efficiency of the cache line status by correlating a status bit field or the like against cache lines included in the cache is disclosed in, for example, Japanese Patent Application Laid-open No. H10-301850 Publication. A technique for enabling incorporation of the data cache to be reliably tracked by providing a directory including incorporation bits, command bits, and data bits, in a common second level cache is disclosed in, for example, Japanese Patent Application Laid-open No. H8-235061 Publication.

However, the conventional art has a problem that the speed of the machine cycle of the cache memory cannot be increased.

More specifically, when the second level cache obtains registration information from the first level cache so as to eliminate contradictions between the first level cache and the second level cache, a delay is caused because the tag is accessed in two stages.

Although there has been a notable increase in the processing speeds of CPUs in recent years, the CPU is encumbered by the slow processing speed of the cache memory that passes data to the CPU, making the problem of cache memory delay even more serious.

It is important to eliminate delay that arises when obtaining registration information from the first level cache, and increase the machine cycle speed.

The present invention has been achieved in order to solve the above problems of the conventional art, and aims to provide a cache memory and method for controlling a cache memory that can eliminate delay arising in the cache memory and increase the machine cycle speed.

SUMMARY OF THE INVENTION

It is an object of the present invention to solve at least the above problems in the conventional technology.

A cache memory according to one aspect of the present invention passes data to a processor based on a request from the processor, and includes a first-level cache-memory-unit that stores data; a second-level cache-memory unit that stores data that is same as the data stored in the first-level cache-memory unit; a storage unit that stores a part of information relating to the first-level cache-memory unit; and a coherence maintaining unit that maintains cache-coherence between the first-level cache-memory unit and the second-level cache-memory unit based on information stored in the storage unit.

A method for controlling a cache memory that passes data to a processor based on a request from the processor, wherein the cache memory includes two cache-memory units that store same data according to another aspect of the present invention includes storing a part of information relating to one of the cache-memory units; and maintaining cache-coherence between the two cache-memory units based on information stored.

A method for controlling a cache memory that passes data to a processor based on a request from the processor, the cache memory including two cache-memory units that store same data according to still another aspect of the present invention includes storing a part of information relating to one of the cache-memory unit; and correcting an error in the one of the cache-memory unit based on the information stored.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a table of an example of meanings appended to first-level cache information;

DETAILED DESCRIPTION

Exemplary embodiments of a cache memory and a method for controlling a cache memory according to the present invention will be explained below in detail with reference to the accompanying drawings.

The cache memory according to this embodiment excludes the copy of the tag included in the information of the first level cache, which is conventionally used, from the second level cache. A part of information of the first level cache is held in a tag unit of the second level cache, and the status of the first level cache is obtained based on the information being held.

This avoids accessing the tag in two stages, and maintains coherence between the first level cache and the second level cache.

Figure 1:
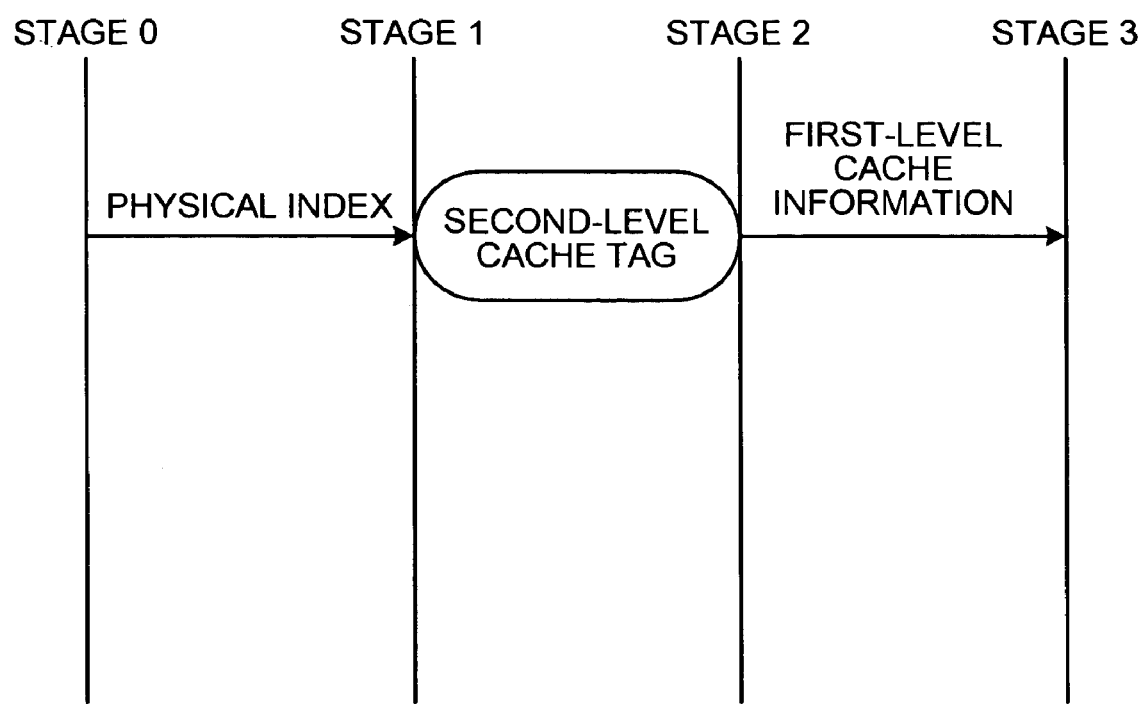
FIG. 1 is a schematic of a state of obtaining a status of a first level cache according to an embodiment of the present invention.

As shown in FIG. 1, when the tag unit of the second level cache is accessed in a physical index, the status of the first level cache can be speedily obtained, since the tag unit of the second level cache includes information relating to the first level cache.

Figure 2:
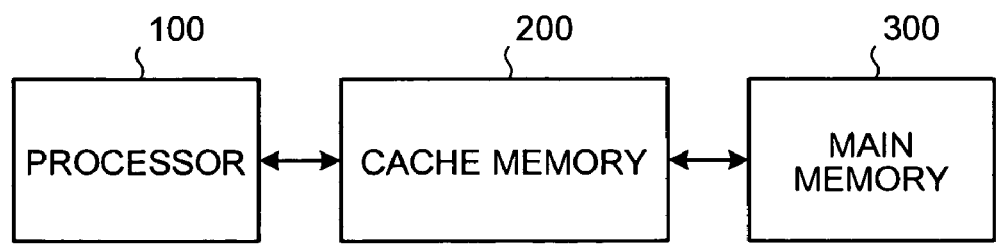
FIG. 2 is a block diagram of a cache memory according to the embodiment.

The cache memory according to this embodiment can be fitted inside a processor, or appended to the processor, but the explanation that follows describes an example of a system where a cache memory 200 is directly connected to a processor 100, and a main memory 300 is accessed via the cache 200, as shown in FIG. 2.

The associative method used by the cache memory of this embodiment is, for example, a two-way set associative method that has two types of ways (way 0 and way 1).

Figure 3:
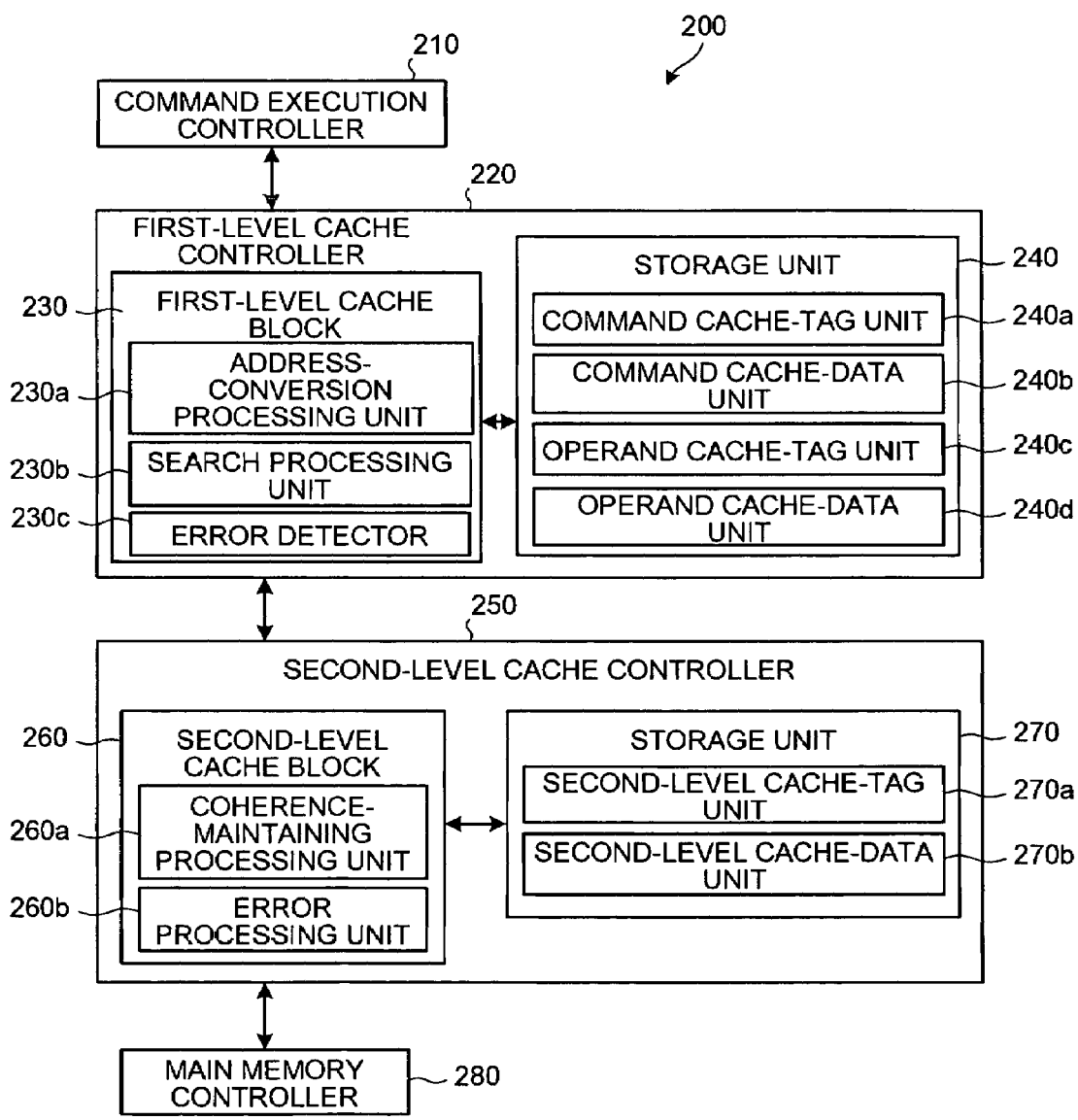
FIG. 3 is a functional block diagram of the cache memory according to the embodiment.

FIG. 3 is a functional block diagram of the constitution of the cache memory 200 according to this embodiment. As shown in FIG. 3, the cache memory 200 includes a command execution controller 210, a first level cache controller 220, a second-level cache controller 250, and a main memory controller 280.

Figure 4:
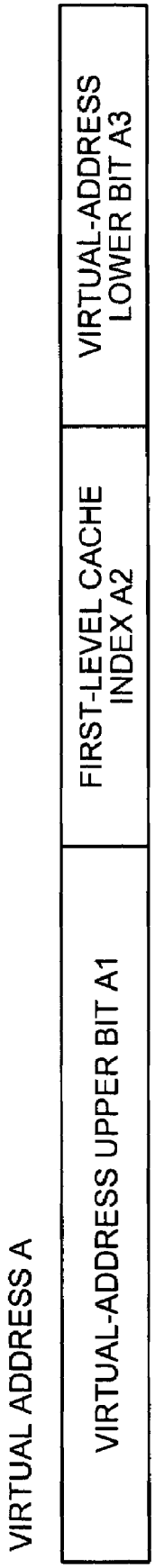
FIG. 4 is a schematic of a data structure of a virtual address.

The command execution controller 210 receives a virtual address A from the processor 100, and passes the received virtual address A to the first level cache controller 220. FIG. 4 is an example of the data structure of the virtual address A.

As shown in FIG. 4, the virtual address A includes a virtual-address upper bit A1, a first-level cache index A2, and a virtual-address lower bit A3. The virtual-address upper bit A1 is converted to a physical address, and is thereafter used in determining whether or not data requested by the processor 100 has been hit.

The first-level cache index A2 stores information for specifying the position of a tag, stored in a storage unit 240 of the first level cache controller 220 (explained later). The virtual-address lower bit A3 stores other information.

The first level cache controller 220 has a first level cache block unit 230, and a storage unit 220. The first level cache block unit 230 has an address-conversion processing unit 230a, a search processing unit 230b, and an error detector 230c.

Figure 5:
FIG. 5 is a schematic of a data structure of a physical address.

The address-conversion processing unit 230a receives the virtual address A from the command execution controller 210, and converts the received virtual address A to a physical address A'. FIG. 5 is an example of the data structure of the physical address A'.

As shown in FIG. 5, the physical address A' includes a physical-address upper bit A1', a second level cache index A2', and a physical-address lower bit A3'. A tag comparison address is stored in the physical-address upper bit A1'.

The tag comparison address is an address used in determining whether data has been hit. Specifically, if the physical address of the tag specified by the first-level cache index A2 is equal to the tag comparison address, this indicates that the data has been hit, and if it is not equal, the data has not been hit.

The second level cache index A2' stores information for specifying the position of a tag, which is stored in a storage unit 270 of the second-level cache controller 250 and will be explained later. The physical-address lower bit A3' stores other data.

The search processing unit 230b determines whether data, which is requested by the processor 100, exists in the first level cache controller 220. When the requested data exists in the first level cache controller 220, the search processing unit 230b passes the data via the command execution controller 210 to the processor 100. On the other hand, when the data requested by the processor 100 does not exist in the first level cache controller 220, the search processing unit 230b notifies the second-level cache controller 250 of that fact. The search processing unit 230b carries out write-back processing to the storage unit 240 of the first level cache controller 220.

More specifically, based on the first-level cache index A2 included in the virtual address A, the search processing unit 230b searches the corresponding tag from a command cache-tag unit 240a, or an operand cache-tag unit 240c. Hereinafter, tags that are stored in the command cache-tag unit 240a or the operand cache-tag unit 240c will be termed first level cache tags.

The command cache-tag unit 240a stores tags corresponding to a command cache-data unit 240b, which stores commands, and the operand cache-tag unit 240c stores tags corresponding to an operand cache-data unit 240d that stores data.

Figure 6:
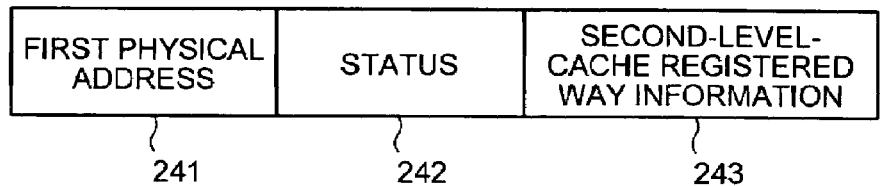
FIG. 6 is a schematic of a data structure of a first level cache tag.

FIG. 6 is an example of the data structure of a first level cache tag. As shown in FIG. 6, the first level cache tag includes a first physical address 241, a status 242, and second-level-cache registered way information 243.

The search processing unit 230b compares the first physical address 241 with the physical-address upper bit A1', and, when they match, the data requested by the processor 100 has been hit. On the other hand, when they do not match, the data requested by the processor 100 has not been hit. The status 242 stores information indicating whether the first level cache tag is valid.

The second-level-cache registered way information 243 stores information for specifying the way of the second level cache in which data, which corresponds to the first level cache tag, is registered (hereinafter, "way specification information").

The way specification information is stored in the first level cache tag, enabling it to be speedily written back from the first level cache controller 220 to the second-level cache controller 250.

By using the way specification information when there has been a request for write-back from the first level cache controller 220 to the second-level cache controller 250, there is no need to search the tag of the second level cache a second time, and so the data can be written back to the second-level cache controller 250 at any time in the way that is specified by the way specification information.

The search processing unit 230b compares the first physical address 241, included in the first level cache, with the physical-address upper bit A1'. When they match, the search processing unit 230b detects a corresponding command or data from the command cache-data unit 240b or the operand cache-data unit 240d, and passes the detected command or data via the command execution controller 210 to the processor 100.

When the first physical address 241 of the first level cache tag does not match the physical-address upper bit A1', no corresponding data exists in the first level cache controller 220. Therefore, the search processing unit 230b passes the physical-address A and the first-level cache index A2, from which the corresponding data should be obtained, to the second-level cache controller 250.

The error detector 230c detects errors that occur in the command cache tag 240a, the command cache-data unit 240b, the operand cache-tag unit 240c, and the operand cache-data unit 240d.

When the error detector 230c has detected an error, it notifies the second-level cache controller 250 that the error has occurred, and passes information specifying the first-level cache index A2 relating to the data where the error occurred, and the command side or way side of the first level cache where the error occurred, (hereinafter, "error-way specification information") to the second-level cache controller 250.

Subsequently, the second-level cache controller 250 will be explained. The second-level cache controller 250 has a second level cache block 260, and a storage unit 270. The second level cache block 260 has a coherence-maintaining processing unit 260a, and an error processing unit 260b.

According to a request from the first level cache controller 220, the coherence-maintaining processing unit 260a searches the corresponding data from the storage unit 270, and passes the searched data to the first level cache controller 220. The coherence-maintaining processing unit 260a maintains coherence between the first level cache controller 220 and the second-level cache controller 250. The coherence-maintaining processing unit 260a also performs write-back processing to the storage unit 270 of the second-level cache controller 250.

Specifically, the second level cache block 260 receives the physical address A' and the first-level cache index A2 from the first level cache controller 220, and, based on the second-level cache index A2' that is included in the physical address A', the second level cache block 260 searches the corresponding tag from a second-level cache-tag unit 270a. In this embodiment, a tag included in the second-level cache-tag unit 270a is termed a second-level cache tag.

Figure 7:
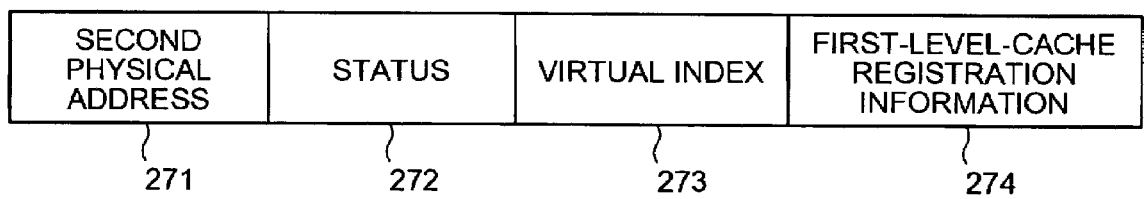
FIG. 7 is an example of the data structure of a second-level cache tag.

FIG. 7 is an example of the data structure of a second-level cache tag. As shown in FIG. 7, the second-level cache tag includes a second physical address 271, a status 272, a virtual index 273, and first-level-cache registration information 274.

The coherence-maintaining processing unit 260a compares the second physical address 271 with the physical-address upper bit A1'. When they match, this signifies that the data requested by the processor 100 is stored in the second-level cache-data unit 270b. When they do not match, this signifies that the data requested by the processor 100 is not stored in the second-level cache-data unit 270b.

The status 272 stores information indicating whether the second-level cache tag is valid. The coherence-maintaining processing unit 260a compares the virtual index 273 with the first-level cache index A2, and determines whether they are synonymous.

When the first-level cache index A2 is equal to the virtual index 273, they are not synonymous. They are synonymous when the first-level cache index A2 and the virtual index 273 are not equal. The processing that is carried out when a synonym has been determined will be explained with reference to a flowchart below.

The first-level-cache registration information 274 stores registration information that relates to the first level cache controller 220. By referring this registration information, the second-level cache controller 250 can ascertain the registration status of the first level cache controller 220.

The registration information includes four bits, which have the meanings shown in FIG. 8. While this embodiment describes an example where the registration information includes four bits, there is no restriction on this, and it may include any number of bits.

As shown in FIG. 8, the registration information of "0000" indicates that "command and operand are both invalid", the registration information of "0110" indicates that "only way 0 of operand is updated" the registration information of "0111" indicates that "only way 1 of operand is updated", the registration information of "1000" indicates that "way 0 of command is valid, and operand is invalid", and the registration information of "1001" indicates that "way 1 of command is valid, and operand is invalid".

The registration information of "1010" indicates that "command is invalid, and way 0 of operand is communal", the registration information of "1011" indicates that "command is invalid, and way 1 of operand is communal", the registration information of "1100" indicates that "way 0 of command is valid, and way 0 of operand is communal".

The registration information of "1101" indicates that "way 0 of command is valid, and way 1 of operand is communal", the registration information of "1110" indicates that "way 1 of command is valid, and way 0 of operand is communal", and the registration information of "1111" indicates that "way 1 of command is valid, and way 1 of operand is communal".

"Updated" indicates a possibility that data relating to the first level cache controller 220 may have been rewritten. "Communal" indicates that there is no possibility that the data relating to the first level cache controller 220 has been rewritten.

In other words, the second level cache block 260 can speedily ascertain the status of the first level cache controller 220 by referring the registration information included in the second-level cache tag. The second level cache block 260 holds the information shown in FIG. 8.

The error processing unit 260b corrects errors that occur in the first level cache controller 220 and the second-level cache controller 250. To increase the response speed, data stored in the first level cache controller 220 is protected only by parity, and error cannot be corrected only by the first level cache controller 220. Therefore, the error processing unit 260b uses data, which is protected by an error correcting code (ECC) of the second level cache controller, to correct an error in the first level cache controller 220.

When the data requested by the processor 100 does not exist in the second-level cache controller 250, the main memory controller 280 requests the data from the main memory 300. The main memory controller 280 receives the data from the main memory, and passes the received data to the second-level cache controller 250.

Figure 9:
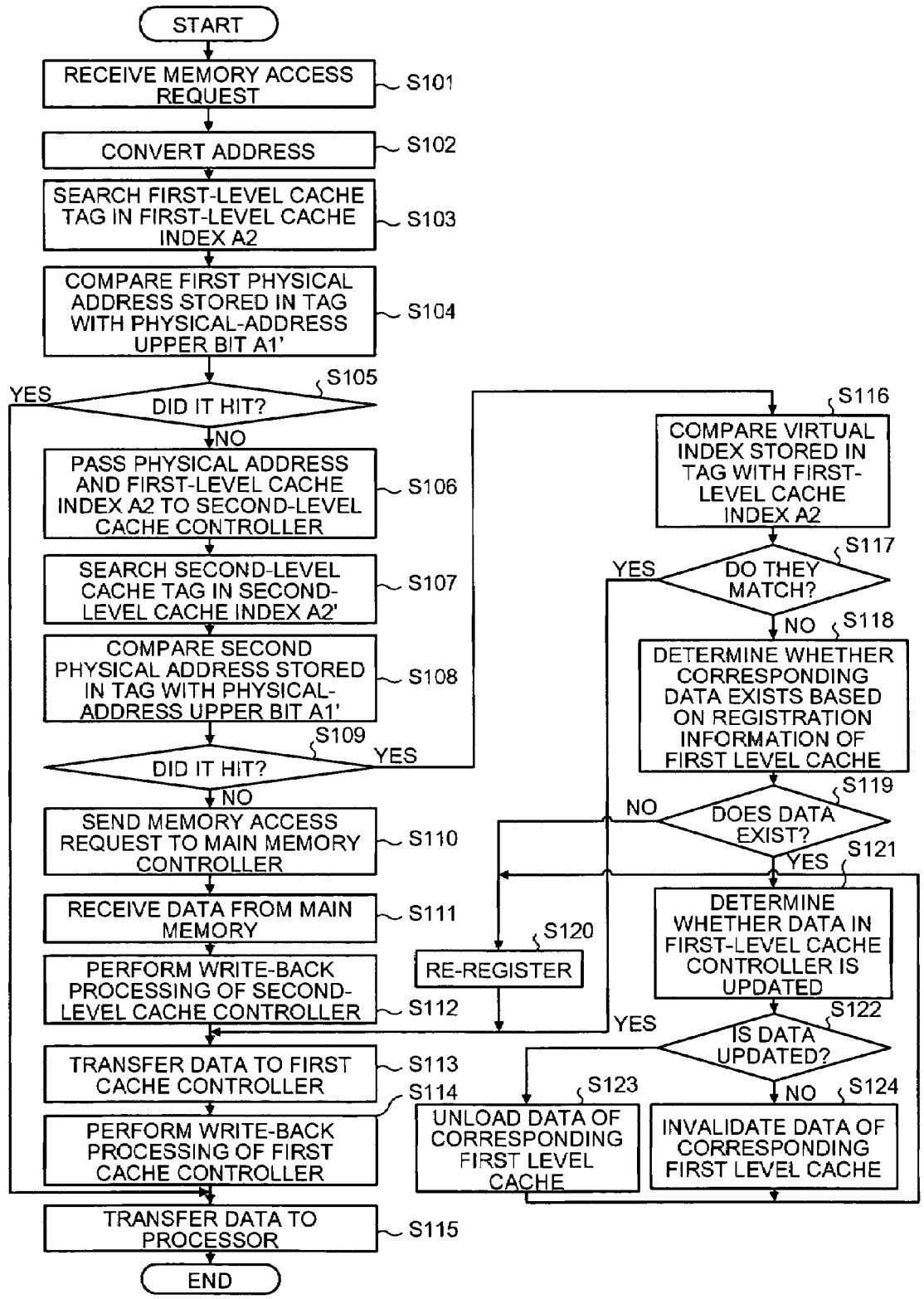
FIG. 9 is a flowchart of data processing of the cache memory according to the embodiment.

Subsequently, data processing performed by the cache memory of this embodiment will be explained. FIG. 9 is a flowchart of a data process of the cache memory according to this embodiment. As shown in FIG. 9, the command execution controller 210 receives a memory access request (step S101), the address-conversion processing unit 230a converts the address (step S102), and the search processing unit 230b searches the first level cache tag from the first-level cache index A2 (step S103).

The search processing unit 230b then compares the first physical address 241, which is stored in the tag, with the physical address A' (step S104), and determines whether the data has been hit (step S105). In the case of a hit ("YES" at step S105), the process shifts directly to step S115.

On the other hand, when there is no hit ("NO" at step S105), the physical address A' and the first-level cache index A2 are passed to the second-level cache controller 250 (step S106), and the coherence-maintaining processing unit 260a searches the second-level cache tag from the second-level cache index A2' (step S107).

The coherence-maintaining processing unit 260a compares the second physical address 271 stored in the second-level cache tag with the physical-address upper bit A1' (step S108), and determines whether the data has been hit (step S109).

When there is no hit ("NO" at step S109), a memory access request is sent to the main memory controller 280 (step S110), and the main memory controller 280 passes data from the main memory to the second-level cache controller 250 (step S111).

The coherence-maintaining processing unit 260a performs write-back processing (step S112), and transfers the data to the first level cache controller 220 (step S113). The search processing unit 230b performs write-back processing (step S114), and transfers the data to the processor 100 (step S115).

When the data has been hit ("YES" at step S109), the virtual index 273 of the second-level cache tag is compared with the first-level cache index A2 (step S116), and it is determined whether they match (step S117). When they match ("YES" at step S117), the processing shifts to step S113.

When they do not match (a synonym) ("NO" at step S117), it is determined whether corresponding data exists, based on the first-level-cache registration information 274 (step S118). When the data does not exist ("NO" at step S119), the data relating to the virtual index of the first level cache controller 220 is re-registered (step S120) and processing shifts to step S113.

On the other hand, when the corresponding data does exist ("YES" at step S119), it is determined whether the data of the first level cache controller 220 is updated (step S121). If so ("YES" at step S112), the data of the corresponding first level cache is unloaded (step S123), and processing proceeds to step S120.

When the data is not updated ("NO" at step S122), the data of the corresponding first level cache is deemed invalid (step S124), and processing shifts to step S120.

Figure 10:
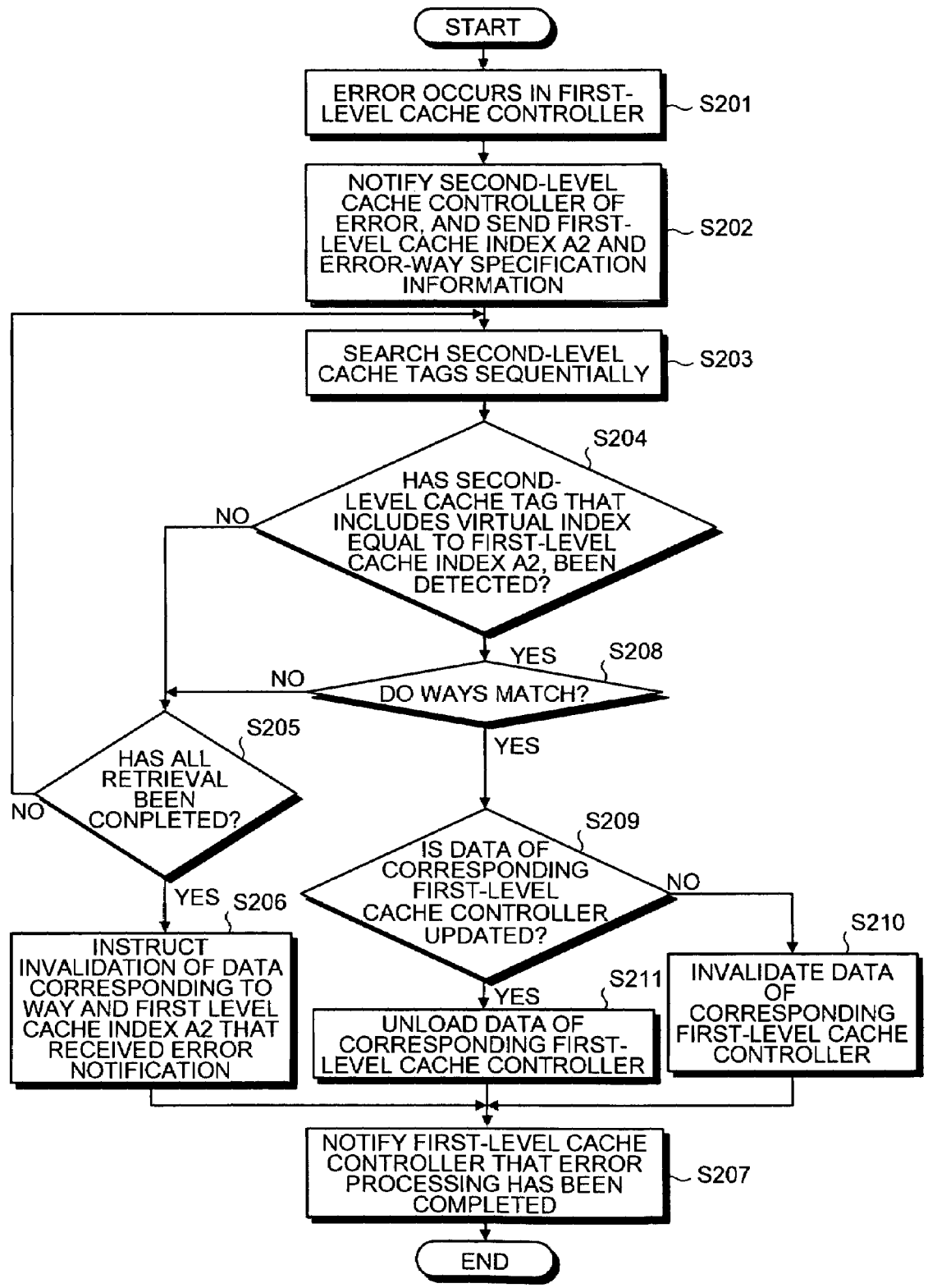
FIG. 10 is a flowchart of error processing according to the embodiment.
Figure 11:
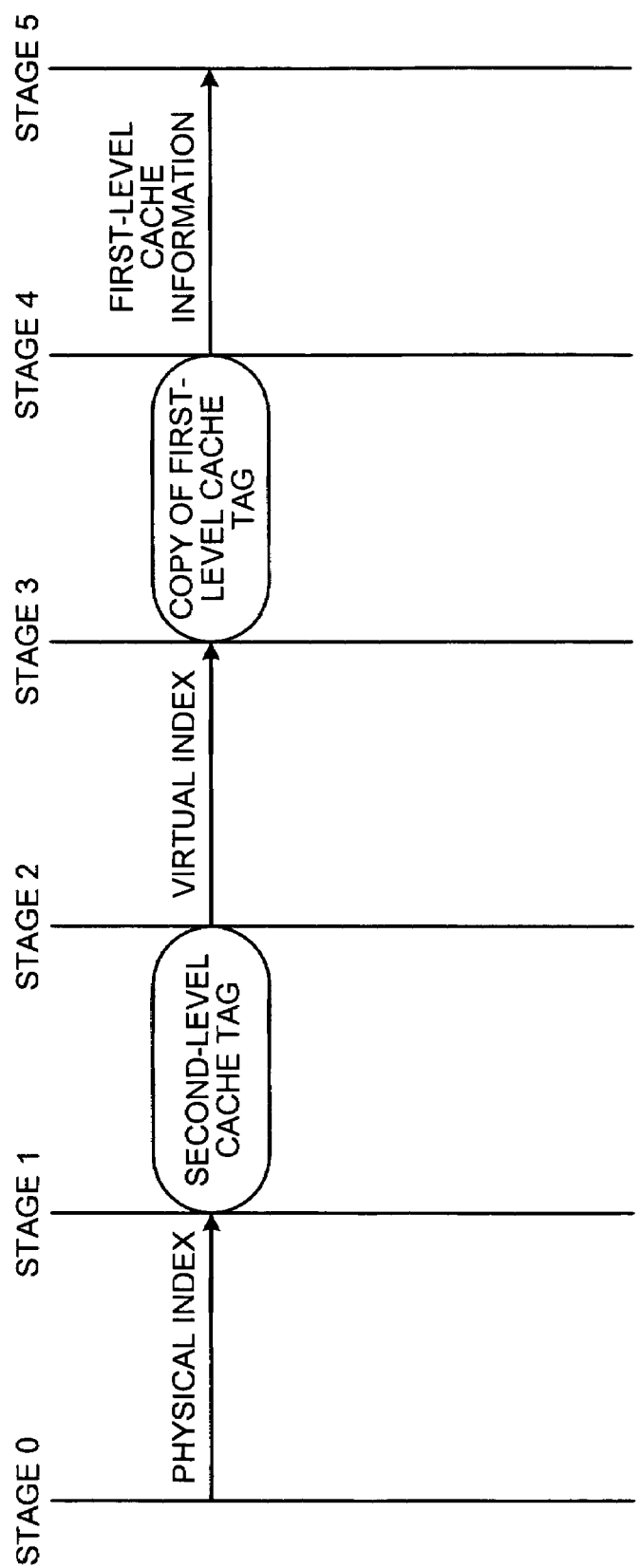
FIG. 11 is a schematic of a stage of obtaining a status of a first level cache according to a conventional technique.

Subsequently, error processing performed by the cache memory 200 will be explained. FIG. 10 is a flowchart of error processing according to this embodiment. As shown in FIG. 10, when an error occurs in the first level cache controller 220 (step S201), the error detector 230c notifies the second-level cache controller 250 of the error occurrence, and also sends the first-level cache index A2 and error-way specification information (step S202).

The error processing unit 260b sequentially searches the second-level cache tags (step S203), and determines whether a second-level cache tag, which includes a virtual index equal to the first-level cache index A2, has been detected (step S204).

When a second-level cache tag, which includes a virtual index equal to the first-level cache index A2, has not been detected ("NO" at step S204), the error processing unit 260b determines whether all retrieval has completed (step S205), and if not ("NO" at step S205), shifts back to step S203.

When all retrieval has been completed ("YES" at step S205), the error processing unit 260b instructs the invalidation of data that corresponds to the way and the first-level cache index A2 that received the error notification (step S206), and notifies the first level cache controller 220 that error processing has been completed (step S207).

On the other hand, when a second-level cache tag, which includes a virtual index equal to the first-level cache index A2, has been detected ("YES" at step S204), the error processing unit 260b determines whether the ways match (step S208), and if not ("NO" at step S208), shifts to step S205.

When the ways match ("YES" at step S208), the error processing unit 260b determines whether or not the data of the corresponding first level cache controller 220 is updated (step S209). When the data is updated ("YES" at step S209), the data of the corresponding first level cache controller 220 is unloaded (step S211), and processing shifts to step S207.

On the other hand, when the data is not updated ("NO" at step S209), the data of the corresponding first level cache controller 220 is invalidated (step S210), and processing shifts to step S207.

As described above, the cache memory 200 according to this embodiment stores registration information of the first level cache controller 220 in the second-level cache tag. When a memory access request has been received from the first level cache controller 220, the coherence-maintaining processing unit 260a searches the corresponding second-level cache tag, transfers the data requested by the processor to the first level cache, and maintains coherence between the first level cache controller 220 and the second-level cache controller, based on the registration information that is stored in the second level cache. This avoids accessing the tag in two stages, and enables the machine cycle speed of the cache memory 200 to be increased.

Since there is no need to store a copy of the first level cache tag in the storage unit 270 of the second-level cache controller 250, as in conventional systems, it becomes possible to reduce the amount of materials.

According to the present invention, a registration status of a first level cache can be speedily obtained, and machine cycle speed can be increased.

Moreover, according to the present invention, an error that occurs in the first level cache can be efficiently corrected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cache memory that passes data to a processor based on a request from the processor, comprising:
    a first-level cache-memory unit that stores first data;
    a second-level cache-memory unit that stores second data that includes the first data stored in the first-level cache-memory unit, and further stores validation information of the first data; and
    a coherence maintaining unit that maintains cache-coherence between the first-level cache-memory unit and the second-level cache-memory unit based on the validation information when a part of the second data is accessed.

2. The cache memory according to claim 1, wherein the second-level cache-memory unit further stores a physical address of a tag relating to the second-level cache-memory unit, a status, and a virtual index, and
    the physical address, the status, the virtual index, and the validation information are associated with each other.

3. The cache memory according to claim 1, wherein the validation information includes a plurality of bits, and
    the coherence maintaining unit acquires a registration status of the first-level cache-memory unit from the bits, and maintains the cache-coherence based on the registration status.

4. The cache memory according to claim 1, wherein
    the first-level cache-memory unit further stores a physical address of a tag relating to the first-level cache-memory unit, a status, and way information relating to a way that is registered in the second-level cache-memory unit; and
    the physical address, the status, and the way information are associated with each other.

5. The cache memory according to claim 4, further comprising a correcting unit that, when an error occurs in the first-level cache-memory unit, corrects the error based on the validation information and the way information.

6. The cache memory according to claim 5, wherein,
the correcting unit determines whether there is error data that indicates occurrence of the error is updated, and
if the error data is updated, the correcting unit unloads the error data to the second-level cache-memory unit, and
if the error data is not updated, the correcting unit invalidates the error data.

7. A method for controlling a cache memory that passes data to a processor based on a request from the processor, wherein the cache memory includes a first cache-memory unit and a second cache memory unit, the first cache memory unit stores first data, and the second cache memory unit stores second data that include the first data the method comprising:
storing validation information of the first data to the second cache memory unit; and
maintaining cache-coherence between the first cache-memory unit and the second cache memory unit based on the validation information stored when a part of the second data is accessed.

8. The method according to claim 7, wherein
the storing includes storing a physical address of a tag relating to the one of the cache-memory unit, a status, and a virtual index; and
the physical address, the status, the virtual index, and the validation information are associated with each other.

9. A method for controlling a cache memory that passes data to a processor based on a request from the processor, the cache memory includes a first cache-memory unit and a second cache memory unit, the first cache memory unit stores first data, and the second cache memory unit stores second data that includes the first data, the method comprising:
storing validation information of the first data to the second cache memory unit; and
correcting an error in the first cache-memory unit based on the validation information.

10. The method according to claim 9, wherein,
the correcting includes determining whether there is error data that indicates occurrence of the error is updated, and
if the error data is updated, the correcting includes unloading the error data to other of the cache-memory unit, and
if the error data is not updated, the correcting includes invalidating the error data.

11. A cache memory comprising:
a first-level cache-memory unit that stores first data;
a second-level cache-memory unit that stores second data that includes the first data and validation information of the first data;
a coherence maintaining unit that maintains cache-coherence between the first-level cache-memory unit and the second-level cache-memory unit based on the validation information;
a correcting unit correcting an error that occurs in the first-level cache-memory unit;
wherein the correcting unit determines whether there is error data that indicates occurrence of the error is updated, the correcting unit unloads the error data to the second-level cache-memory unit if the error data is updated, and the correcting unit invalidates the error data if the error data is not updated.

* * * * *

UNITED STATES PATENT AND TRADEMARK OFFICE
CERTIFICATE OF CORRECTION

| | |
|---|---|
| PATENT NO. | : 7,428,617 B2 |
| APPLICATION NO. | : 10/998561 |
| DATED | : September 23, 2008 |
| INVENTOR(S) | : Tomoyuki Okawa et al. |

It is certified that error appears in the above-identified patent and that said Letters Patent is hereby corrected as shown below:

Column 9, Line 13, after "first data" insert --,--.

Signed and Sealed this

Ninth Day of December, 2008

JON W. DUDAS
*Director of the United States Patent and Trademark Office*